United States Patent
Holt

[15] 3,697,705

[45] Oct. 10, 1972

[54] ELECTROMAGNETIC TRANSDUCER RECORDING HEAD HAVING A LAMINATED CORE SECTION AND TAPERED GAP

[72] Inventor: Norman I. Holt, Pasedena, Calif.

[73] Assignee: California Institute of Technology, Pasadena, Calif.

[22] Filed: July 24, 1969

[21] Appl. No.: 844,315

[52] U.S. Cl. ..........................................179/100.2 C

[51] Int. Cl. ............................G11b 5/16, G11b 5/24

[58] Field of Search...........179/100.2 C; 346/74 MC; 340/174.1 F

[56] References Cited

UNITED STATES PATENTS

| | | | |
|---|---|---|---|
| 2,469,266 | 5/1949 | Howell | 179/100.2 |
| 2,538,405 | 1/1951 | Zenner | 179/100.2 |
| 2,822,427 | 2/1958 | Atkinson et al. | 179/100.2 |
| 3,080,642 | 3/1963 | Woods et al | 179/100.2 |
| 3,304,370 | 2/1967 | Johnson | 179/10.2 |
| 3,372,243 | 2/1968 | Schuller | 179/100.2 |
| 3,526,725 | 9/1970 | Camras | 179/100.2 C |

*Primary Examiner*—Terrell W. Fears
*Assistant Examiner*—Robert S. Tupper
*Attorney*—Thomas D. Linton, Jr.

[57] ABSTRACT

An electromagnetic transducer head is provided which exhibits a wide band recording response characteristic, and which comprises a plurality of separate magnetic head structures operating over different, overlapping frequency bands, and formed into an integral assembly. Each separate head structure of the assembly includes a magnetic core, and each core is provided with a gap. The cores are positioned adjacent one another so that the gaps are aligned to define a common gap, and the recording medium is drawn across the common gap. The common gap is tapered, with the gap width of each aligned gap section being different from its adjacent section. Separate windings are wound about the cores, each having different numbers of turns so as to cover overlapping frequency ranges.

5 Claims, 8 Drawing Figures

INVENTOR:
Norman I. Holt

By Thomas D Linton, Jr.
ATTORNEY

INVENTOR:
Norman I. Holt

By Thomas D. Linton, Jr.
ATTORNEY

ELECTROMAGNETIC TRANSDUCER RECORDING HEAD HAVING A LAMINATED CORE SECTION AND TAPERED GAP

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

The prior art electromagnetic transducer heads used for wide-band video and other recording are relatively complicated and expensive structures, and often involve complex mechanical scanning mechanisms. Such prior art heads, moreover, are for the most part inoperative beyond the 8.0 mHz frequency limit for video recording in which frequency modulation techniques must be used, or a 2 mHz frequency limit when used for the high speed storage of computer digital signals.

It is usual in the prior art video recording systems, for example, for the recording electromagnetic transducer heads to be mechanically scanned in a direction so as to traverse the tape laterally as the tape moves through the tape transport system. This scanning action serves to increase the effective tape-to-head speed without the concomitant requirement of excessively long tapes, and it has become the accepted practice for high speed video recording on magnetic tape. More recent video recording apparatus include assemblies in which the heads are rotated by a large diameter drum across the tape at high speed as the tape moves along a spiral or helical path. Such recording apparatus is described, for example, in Copending Application Ser. No. 668,116, filed Sept. 15, 1967, in the name of the present inventor.

The improved transducer head of the present invention may be used in either of the aforesaid mechanical scanning mechanisms. The head is simple and efficient, and it is capable of recording the full video band for monochrome and color television signals, and also of recording high density digital signals for high speed computer storage. For example, the improved transducer head of the invention is capable of storing digital information with a bit rate up to $3.9 \times 10^8$ on a magnetic storage tape. This was established by a computer programmed for analysis of the geometry of the transducer head of the present invention.

In addition, in conjunction with a large diameter drum helical drive recorder, such as described in the aforesaid copending application, and operated, for example, at 3,200 inches per second (i.p.s.) equivalent tape-to-head speed, the transducer head of the invention makes it possible to record an extremely wide band of frequencies directly on the magnetic tape. For example, the transducer head of the invention renders feasible the direct recording to a modulated television carrier in the 50–216 mHz frequency range as received from a present day television station.

The composite electromagnetic transducer head of the present invention, therefore, finds utility whenever wide band recording is required. For example, the transducer head of the invention may be used for high quality video recording, and in conjunction with high speed computer tape storage apparatus.

Specifically, signals corresponding to the full video band width of any of the currently used television standards can be recorded on a magnetic tape by means of the electromagnetic transducer head of the present invention. An example would be the 18 megacycle band width of the field sequential wide band color television signal, used by the medical profession for displaying surgical procedures to students, or other surgeons, in full color.

The composite electromagnetic transducer head to be described herein, as mentioned above, includes a plurality of separate magnetic core structures, which are mounted adjacent one another, and which define a common tapered gap. This gap, for example, can have a width of the order of a few microns at one end and increasing to, for example, 200 microns at the other end. A magnetic tape is drawn by an appropriate tape transport across the common gap in a direction such that the control axis through the gap extends directly across the path of the tape perpendicular to the direction of tape travel.

Since the high frequency response of the transducer head is a function of the gap width and of the tape speed, the section of the composite head of the invention associated with the narrow portion of the common tapered gap provides the required high frequency response, whereas the section associated with the wider part of the common tapered gap provides the required low frequency response. Therefore, the composite electromagnetic transducer head of the present invention is capable, as explained above, of providing a desired wide frequency response through a series of overlapping frequency ranges. The transducer head of the invention may be used, as suggested, in mechanical scanning systems such as described above, to operate effectively at increased tape-to-head speeds and further to permit increased tape-to-head the high frequency response capabilities of the head.

DETAILED DESCRIPTION OF THE ILLUSTRATED EMBODIMENTS

Figure 1:
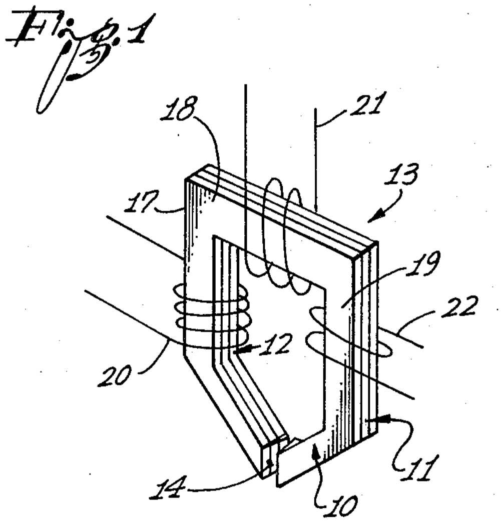
FIG. 1 is a perspective representation of an improved electromagnetic transducer head constructed in accordance with one embodiment of the invention.
Figure 2:
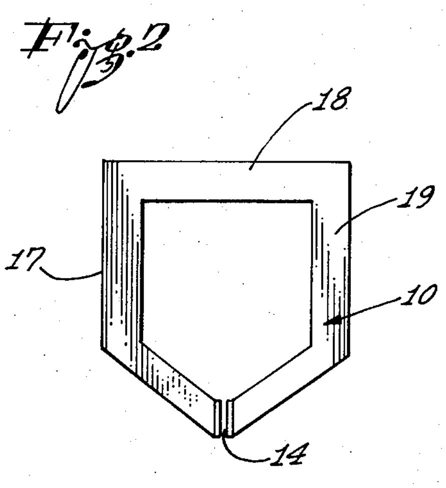
FIG. 2 is a side view of the transducer head of FIG. 1, as seen from the wider grapped surface.
Figure 3:
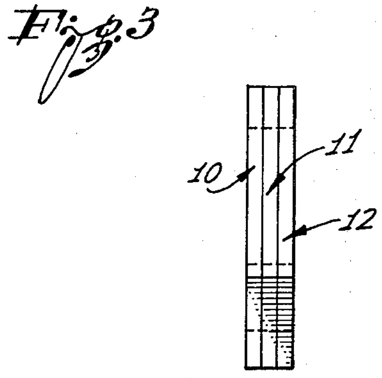
FIG. 3 is an end view of the transducer head of FIG. 1.
Figure 4:
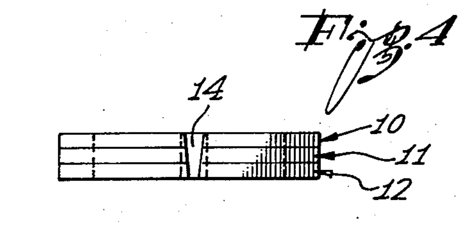
FIG. 4 is a bottom view of the transducer head of FIG. 1 to emphasize the tapered gap configuration thereof.

The head illustrated in FIGS. 1–4 comprises, for example, three laminated core elements 10, 11 and 12, positioned one adjacent the other and each defining a separate tapered gap 13*a*, 13*b*, 13*c*. The resulting three gaps are aligned with one another and provide a common tapered gap 14. The core elements may be fabricated, for example, each of a different sintered carbonyl iron powder composition, and may be chosen from commercially available materials to be effective, in each instance, in the frequency ranges selected for the three cores.

Typical commercial carbonyl materials are identified as "HP" for the core element 10, and for use in the low frequency range of 0–1 MHz; "E" for the core element 11, and for use in the mid-frequency range of 250 kHz – 20 MHz; and "SF" for the core element 12, and for use in the high frequency range of 6 mHz to above 100 MHz. Ferrite materials suitable for the aforesaid purposes are presently commercially available from the Ferroxcube Corporation of America.

The core assembly in the illustrated embodiment may have a dimension of approximately a 3/16th inch cube. The common tapered gap 14 defined by the three core elements 10, 11, 12 may have a minimum width of the order of 5 microinches at its high frequency end (gap **13*a*), and a maximum width of the order of 200 microinches at its low frequency end (gap 13*c*). Each of the core sections may have a thickness, for example, of 0.005 inches. Separate windings 20, 21 and 22 are wound around the rectangular sections of the laminate 17, 18 and 19 of the core sections. Each of the windings 20, 21, 22** has a different number of turns to provide a response in a different one of the selected overlapping frequency bands, as explained above.

The windings in each case, as shown, extend around the entire laminated core assembly. The winding 20, for example, may have 100 turns and may be designed to cover the low frequency range. The winding 21 may be designed to cover the mid-frequency range, and it may have 60 turns. The winding 22 may be designed to cover the high frequency range, and it may have 20 turns. A core constructed, with the dimensions and other parameters suggested above, for example, is capable of recording video signals in the 0–159 MHz frequency range at a tape-to-head speed of 1,600 ips; and up to 319 MHz at a tape-to-head speed of 3,200 ips. These dimensions and parameters are listed above merely as an illustrative example, and are not intended to limit the invention in any way.

Figure 5:
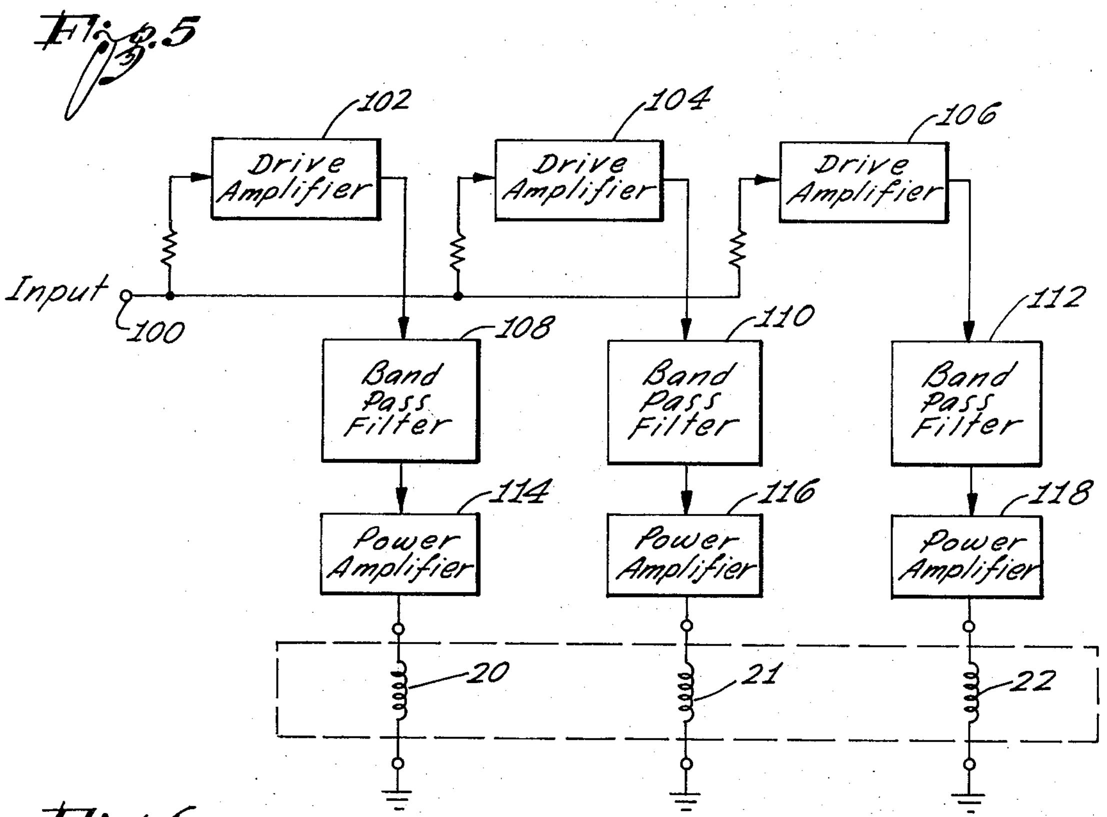
FIG. 5 is a block diagram of a typical recording system which may be used to apply signals to be recorded to the transducer head of the invention, which signals extend through a wide frequency range.

A typical drive system for the transducer head of FIGS. 1–4 is shown in FIG. 5 in block form. The wide band video frequency input signals which are to be recorded by the head are introduced to the system, for example, by way of an input terminal 100. The input terminal is connected to three drive amplifiers 102, 104 and 106. The drive amplifiers are coupled to respective band pass amplifiers 108, 110 and 112. The band pass amplifiers, in turn, supply their outputs through corresponding power amplifiers 114, 116 and 118 to the respective windings 20, 21 and 22 of the transducer head. In this way, the wide band video signals, amplified by the respective amplifiers, are supplied to the various windings, with the video signals in the range of 0–1 MHz, being supplied to the winding 20; video signals in the range of 250 kHz – 20 MHz being supplied to the winding 21; and video signals in the range of 6 MHz to 100 mHz being supplied to the winding 22.

Figure 6:
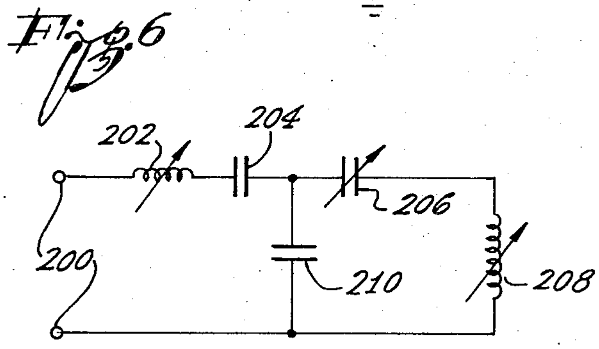
FIG. 6 is a circuit diagram of a typical band pass filter which may be used in the system of FIG. 5.

Each of the band pass amplifiers 108, 110 and 112 may incorporate a band pass network of the inductive-capacitive type shown, for example, in FIG. 6. Each such network includes a pair of input terminals 200. One of the input terminals 200 is connected to an adjustable inductance coil 202 which, in turn, is connected to a capacitor 204. The capacitor 204 is connected to an adjustable capacitor 206 which is connected back to the other input terminal 200 through a further adjustable inductance coil 208. The common junction of the capacitors 204 and 206 is connected back to the other input terminal 200 through a further capacitor 210.

Figure 7:
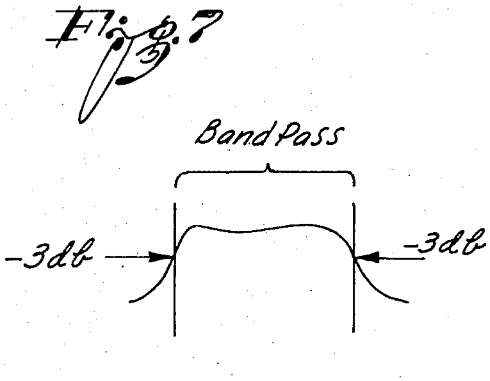
FIG. 7 is a plot of the band pass characteristics of the circuit of FIG. 6.

The band pass network shown in FIG. 6 exhibits band pass characteristics, such as illustrated in FIG. 7. The parameters of the network of FIG. 6 may be selected, for each of the different band pass amplifiers 108, 110 and 112, so that the three separate and overlapping frequency ranges may be covered.

Figure 8:
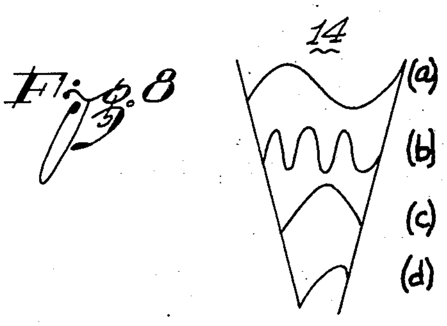
FIG. 8 is a series of curves useful in explaining the operation of the head of the invention.

The functioning of the common tapered gap 14 of the composite head of FIGS. 1–4 may be understood by a consideration of the pictorial representation of FIG. 8. For example, when a signal of a frequency, such as shown at "a," "c" and "d" is applied to the composite head, the relatively wide end of the tapered gap 14 is incapable of causing such a signal to be recorded, since both halves of each cycle of the signal appear in the gap and have a cancelling effect. However, the narrower sections of the gap 14 are capable of recording the signal, since a part only of each cycle appears at the narrower end. Likewise, a higher frequency signal, such as designated at "b" cannot be recorded by the wider part of the gap since the multiple cycles of that signal which appear in the gap tend to cancel. However, for lower frequency signals, an insufficient part of each cycle appears across the narrower part of the gap to provide any appreciable recording effect, so that the wide part of the gap responds to such signals.

The tapered gap 14 may be maintained by a sintered glass separator in accordance with usual practice, incorporating an appropriate non-magnetic filler hardened to exhibit high wearing characteristics. The use of such a sintered gap filler obviates any tendency for the core edge of the gap to chip which would alter the gap dimension. Also, there is no tendency for magnetic particles to adhere to the glass filler, so that the gap remains clean and magnetic short circuits do not occur.

What is claimed is:

1. An electromagnetic transducer head having a wide-band frequency response, said head comprising: a plurality of core sections laminated together, each of said core sections being formed of a different ferromagnetic composition and each core section having a terped gap so that each core section is effective over a different predetermined frequency range, the gap of said core section at its narrowest end being as wide as the wide end of the gap in the adjacent section to said narrowest end of said core section and at its widest end being as wide as the narrow end of the gap in the adjacent section of said wide end of said core section so as to form a common continuous tapered gap in the laminate of said core sections; and a plurality of windings about said laminate of said core sections, each winding being responsive over a different one of said predetermined ranges of frequencies.

2. In the electromagnetic transducer head defined in claim 1, each of said plurality of windings having a different number of turns so as to be resonant over a different overlapping and successive band of frequencies.

3. In the electromagnetic transducer head defined in claim 1, each of said magnetic core sections being formed of a different ferromagnetic composition and each of said windings having an appropriate number of turns to make each of said respective windings resonant over a predetermined frequency range, the frequency ranges being those over which the respective ferromagnetic core compositions are also most effective.

4. The electromagnetic transducer head defined in claim 1, including a sintered vitreous separator formed in said tapered gap and incorporating a non-magnetic filler.

5. The electromagnetic transducer head defined in claim 1, in which said predetermined frequency ranges are overlapping at their respective limits, and in which each of said windings is positioned upon a different linear portion of the aforesaid laminated core assembly.

* * * * *